United States Patent [19]

Ikari

[11] Patent Number: 4,647,995
[45] Date of Patent: Mar. 3, 1987

[54] MAGNETIC RECORDING AND/OR REPRODUCING APPARATUS

[75] Inventor: Masahide Ikari, Maebashi, Japan

[73] Assignee: Victor Company of Japan, Ltd., Yokohama, Japan

[21] Appl. No.: 741,593

[22] Filed: Jun. 5, 1985

[30] Foreign Application Priority Data

Jun. 12, 1984 [JP] Japan .............................. 59-86885[U]
Jun. 13, 1984 [JP] Japan ................................ 59-121132
Jul. 4, 1984 [JP] Japan ........................... 59-100778[U]

[51] Int. Cl.$^4$ ............................................. G11B 5/008
[52] U.S. Cl. ................................... 360/96.2; 360/96.3
[58] Field of Search ..................... 360/96.1, 96.2, 96.3

[56] References Cited

U.S. PATENT DOCUMENTS 4,408,237 10/1983 Takahashi et al. ................. 360/96.3

FOREIGN PATENT DOCUMENTS

| | | |
|---|---|---|
| 1329928 | 6/1972 | United Kingdom . |
| 1315781 | 5/1973 | United Kingdom . |
| 1418012 | 11/1975 | United Kingdom . |
| 1436728 | 5/1976 | United Kingdom . |
| 1456090 | 11/1976 | United Kingdom . |
| 2052833 | 1/1981 | United Kingdom . |

*Primary Examiner*—A. Michael Chambers
*Attorney, Agent, or Firm*—Ladas & Parry

[57] ABSTRACT

A magnetic recording and/or reproducing apparatus for recording and/or reproducing signals on and/or from a magnetic tape which is accommodated within a cassette comprises a case, an inserting opening in the case through which the cassette is inserted into the apparatus in a first direction, a magnetic head for recording and/or reproducing signals on and/or from the tape, a holding mechanism for holding the cassette which is inserted in the first direction via a cassette inserting path in a loaded position within the apparatus, where the magnetic head is in contact with the tape of the cassette in the loaded position, a driving mechanism movable between a first position and a second position, which driving mechanism is separated from and opposes the cassette in the loaded position in the first position and is engageable with the cassette in the second position to drive the tape, a guiding mechanism for guiding the movement of the driving mechanism so that the driving mechanism constantly moves linearly between the first and second positions in a direction approximately perpendicular to the cassette inserting path extending in the first direction, and a moving mechanism connected to the driving mechanism for moving the driving mechanism between the first and second positions.

15 Claims, 17 Drawing Figures

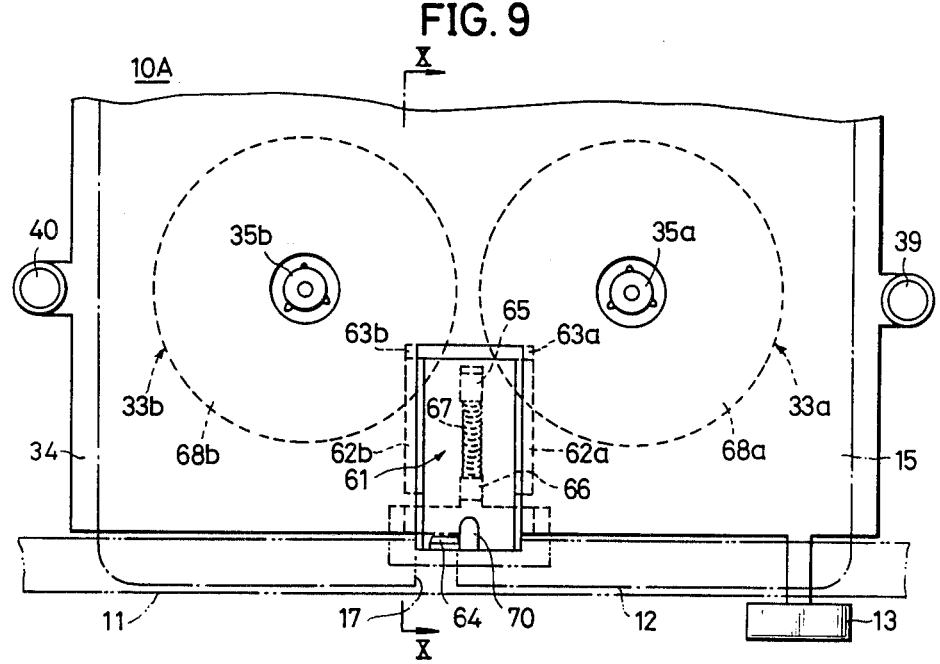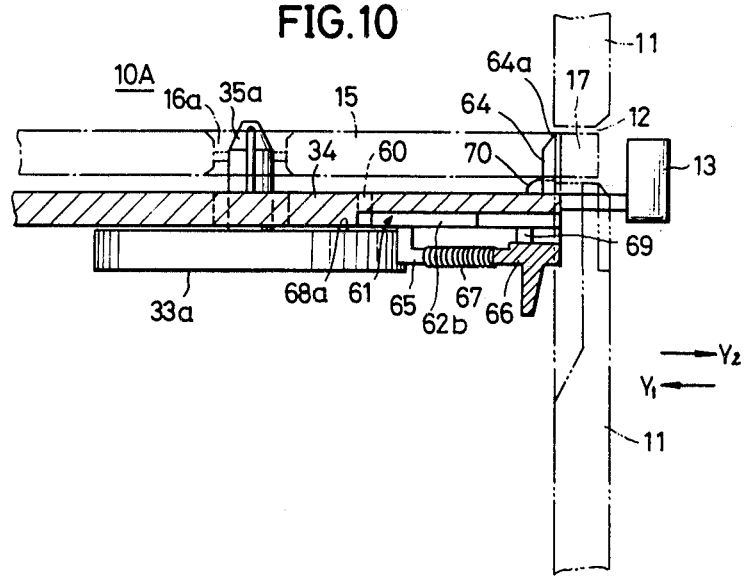

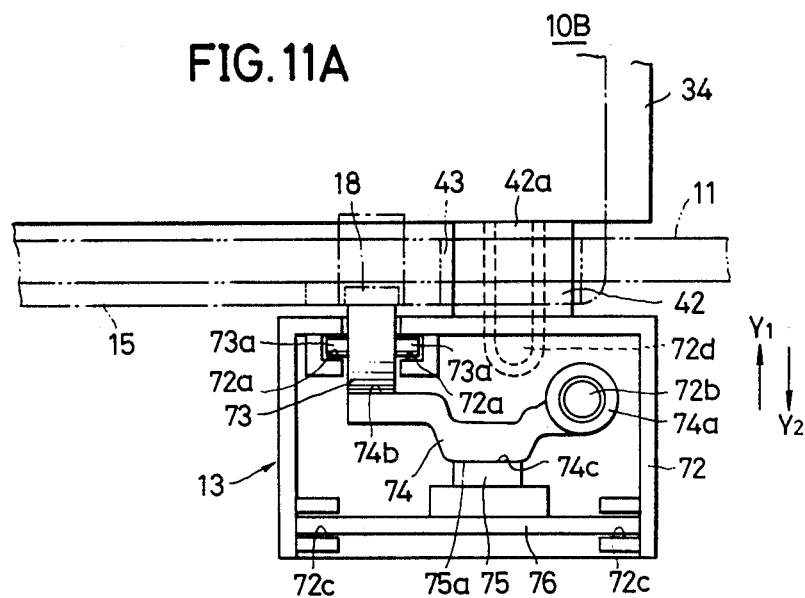
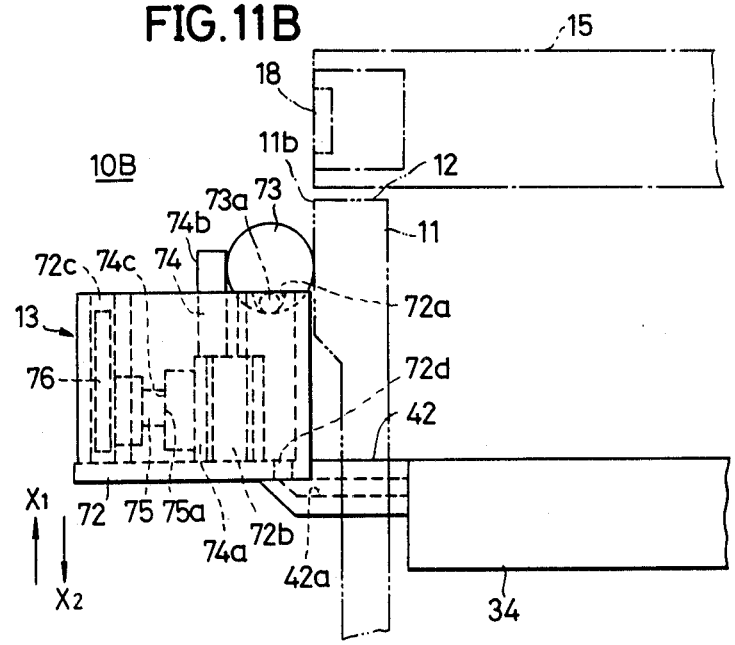

MAGNETIC RECORDING AND/OR REPRODUCING APPARATUS

BACKGROUND OF THE INVENTION

The present invention generally relates to magnetic recording and/or reproducing apparatuses, and more particularly to a magnetic recording and/or reproducing apparatus which is designed to hold a cassette which is inserted into the apparatus in a loaded position where a magnetic tape accommodated within the cassette makes contact with a magnetic head and to move a mechanism for driving the magnetic tape from a position opposing and separated from the cassette which is in the loaded position to a position where the mechanism engages the cassette by moving the mechanism linearly in a direction substantially perpendicular to the insertion path of the cassette.

Recently, work processors, personal computers and the like are used in various applications. Magnetic recording and/or reproducing apparatuses which are used in such systems may be roughly divided into two types, that is, a disc recording and/or reproducing apparatus which uses the so-called hard disc or floppy disc as the recording medium and a data recorder which uses a magnetic tape as the recording medium. The magnetic tape is normally used in a state accommodated wtihin a cassette.

Generally, the data recorder is less expensive compared to the disc recording and/or reproducing apparatus. For this reason, the data recorder is suited for use as a back-up system for the hard disc recording and/or reproducing apparatus. In the conventional data recorder, the cassette which is inserted into the data recorder is held within a holder, and the holder is moved to a predetermined position within the data recorder together with the cassette so as to engage the cassette with a driving mechanism for driving the magnetic tape. However, in the conventional data recorder, a mechanism for detecting whether or not the cassette has been inserted with the correct side thereof facing a predetermined direction, a mechanism for moving the holder, a mechanism for ejecting the cassette outside the data recorder and the like have a complex construction. Hence, there is a problem in that the manufacturing cost of the conventional data recorder cannot be reduced to a large extent due to the complex construction of the mechanisms. In addition, the space which is required within the conventional data recorder so as to enable the holder to move within the data recorder is large. As a result, thee is a limit to the downsizing of the conventional data recorder.

On the other hand, a magnetic recording and/or reproducing apparatus in which a driving mechanism for driving the magnetic tape is moved in an arcuate path so as to engage the cassette which is inserted into the apparatus, was previously proposed in a Japanese Pat. No. 44-26574. However, a large space is required within the apparatus in order to move the driving mechanism in the arcuate path within the apparatus, and there is a problem in that the construction of the apparatus becomes complex. Further, when the driving mechanism is moved in the arcuate path, reel driving shafts of the driving mechanism for engaging reel hubs of the cassette cannot engage smoothly with the reel hubs because the reel driving shafts approach and engage the respective reel hubs with a certain angle.

SUMMARY OF THE INVENTION

Accordingly, it is a general obejct of the present invention to provide a novel and useful magnetic recording and/or reproducing apparatus in which the problems described heretofore are eliminated.

Another and more specific object of the present invention is to provide a magnetic recording and/or reproducing apparatus comprising a mechanism for holding a cassette which is inserted into the apparatus in a loaded position where a magnetic tape accommodated within the cassette makes contact with a magnetic head, and a driving mechanism for driving the magnetic tape by engaging the cassette which is in the loaded position. The driving mechanism moves linearly in a direction substantially perpendicular to the insertion path of the cassette, from a position opposing and separated from the cassette which is in the loaded position to a position where the driving mechanism engages the cassette. According to the apparatus of the present invention, the construction of the apparatus is simple and the manufacturing cost of the apparatus is low compared to those of the conventional apparatus. In addition, it is possible to downsize the apparatus compared to the conventional apparatus.

Still another object of the present invention is to provide a magnetic recording and/or reproducing apparatus in which a detection to determine whether or not the correct side of the cassette is facing a predetermined direction and a positioning of the cassette in the loaded position are performed by a single mechanism. According to the present invention, it is possible to downsize the apparatus compared to the conventional apparatus. Further, the detection to determine whether or not the correct side of the cassette is facing the predetermined direction and the positioning of the cassette in the loaded position can be performed positively.

A further object of the present invention is to provide a magnetic recording and/or reproducing apparatus in which a mechanism for detecting the existence of an erroneous erasure preventing tab of the cassette is provided on a manipulation part which is manipulated when manually moving the driving mechanism. According to the apparatus of the present invention, it is possible to detect the existence of the erroneous erasure preventing tab of the cassette by use of a simple mechanism.

Other objects and further features of the present invention will be apparent from the following detailed description when read in conjunction with the accompanying drawings.

BRIEF DESCRIPTION OF THE DRAWINGS

FIG. 9 is a plan view showing an essential part of the apparatus shown in FIG. 7 in a state where a side detection groove of the cassette is engaged with an engaging member;

FIG. 10 is a view in vertical cross section showing the apparatus shown in FIG. 9 along a line X—X;

FIGS. 11A and 11B are a plan view and a side view respectively showing an essential part of a third embodiment of the magnetic recording and/or reproducing apparatus according to the present invention;

DETAILED DESCRIPTION

Figure 1:
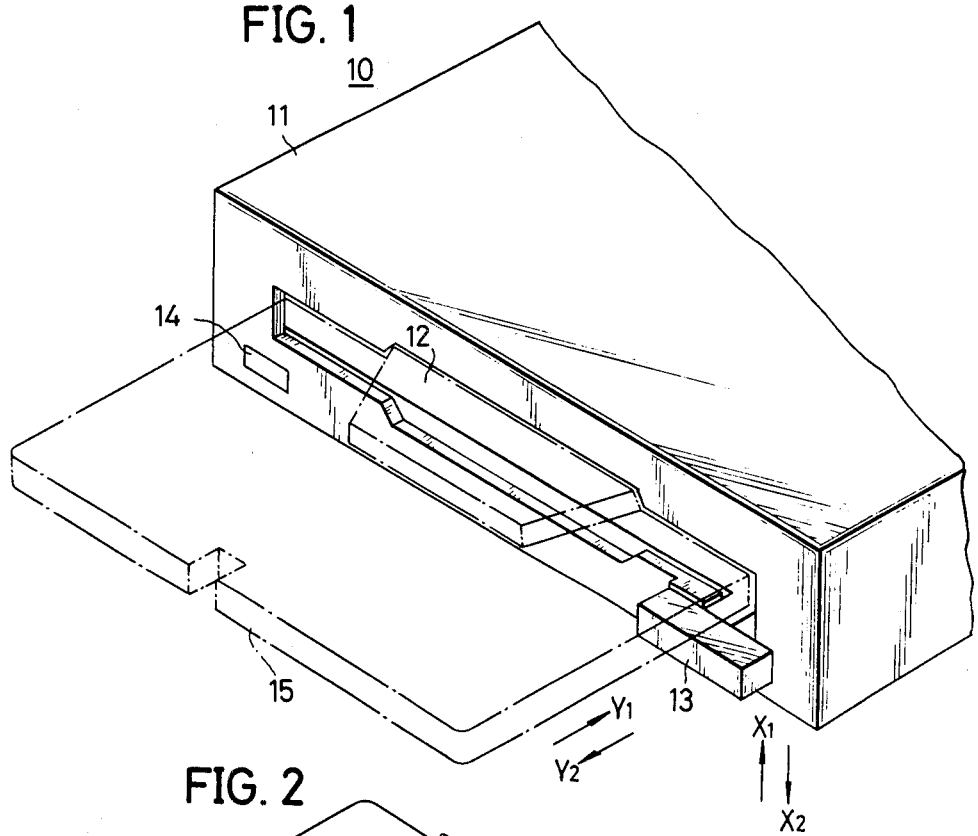
FIG. 1 is a perspective view, with a part cut away, showing the external appearance of a first embodiment of the magnetic recording and/or reproducing apparatus according to the present invention.
Figure 2:
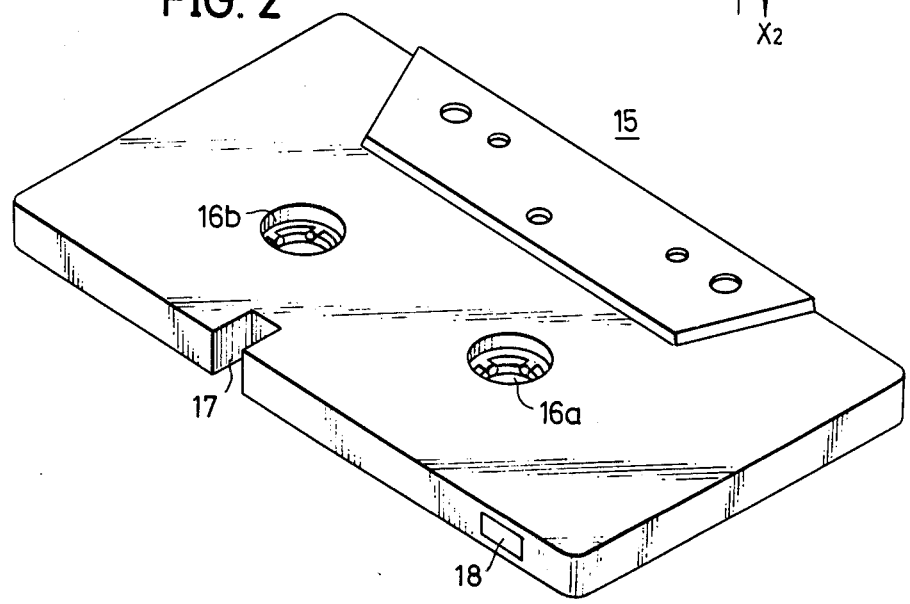
FIG. 2 is a perspective view showing an example of a cassette which is used on the magnetic recording and/or reproducing apparatus according to the present invention.

FIG. 1 is a perspective view showing the external appearance of a first embodiment of the magnetic recording and/or reproducing apparatus according to the present invention. A magnetic recording and/or reproducing apparatus (hereinafter simply referred to as an apparatus) 10 comprises a case 11, an inserting opening 12 through which a cassette 15 indicated by a one-dot chain line is inserted into the apparatus 10 in a cassette inserting direction Y1, a manipulation part (hereinafter simply referred to as a knob) 13, and an indicator lamp 14 which is turned ON when the apparatus 10 is operating. The cassette 15 accommodates therein a magnetic tape (not shown) as the recording medium. As shown in FIG. 2, the cassette 15 comprises reel hubs 16a and 16b, a side detection groove 17 for detecting the side of the cassette 15, and an erroneous erasure preventing tab 18.

Figure 3:
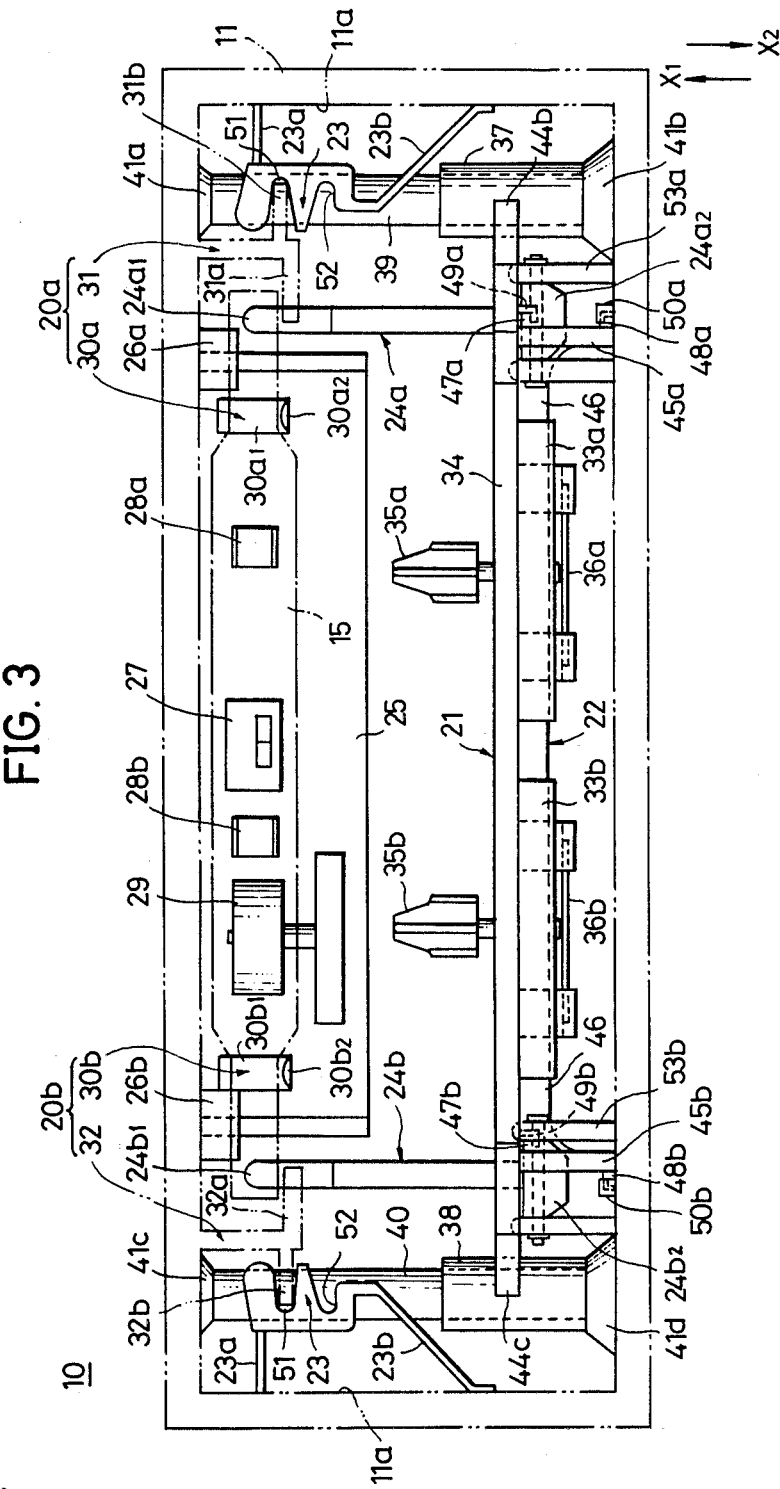
FIG. 3 is a front view showing the apparatus shown in FIG. 1 in a vertical cross section.
Figure 4:
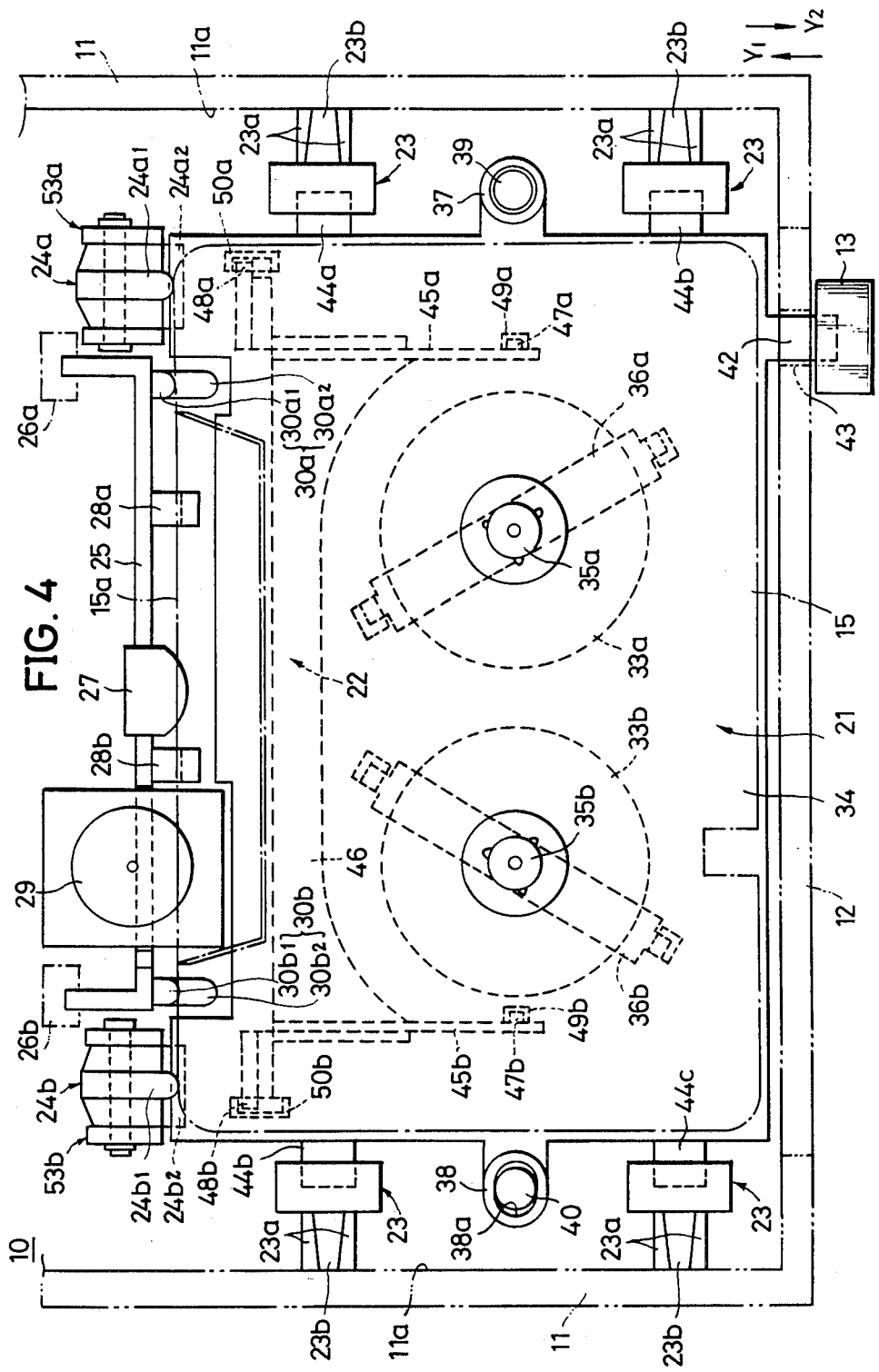
FIG. 4 is a plan view showing the apparatus shown in FIG. 1 in a horizontal cross section with a part omitted.

FIGS. 3 and 4 are a front view and a plan view respectively showing the internal construction of the apparatus 10. The apparatus 10 generally comprises holding parts 20a and 20b for holding the cassette 15 which is inserted into the apparatus 10 in a predetermined loaded position, a driving part 21 which moves to engage the reel hubs 16a and 16b of the cassette for driving the magnetic tape, a guide part 22 for guiding the movement of the driving part 21, locking parts 23 for locking the driving part 21 in a predetermined position, ejecting members 24a and 24b for ejecting the cassette 15 outside the apparatus 10 and the like.

A head base 25 is provided at an inner part of the apparatus 10 in a cassette inserting direction Y1. Mounting parts 26a and 26b are provided on the lower surface of a top plate of the case 11, and the head base 25 is fixed to the mounting parts 26a and 26b. As shown in FIGS. 3 and 4, a magnetic head 27, tape guides 28a and 28b, a pinch roller 29 and the like are disposed on the head base 25 so as to make contact with the magnetic tape of the cassette 15 which is in the loaded position.

Approximately L-shaped stoppers 30a and 30b are fixed on respective two end parts of the head base 25. When the cassette 15 is inserted in the direction Y1 up to the loaded position where the magnetic tape makes contact with the magnetic head 27 a front surface 15a of the cassette 15 makes contact with vertical parts 30a1 and 30b1 of the stoppers 30a and 30b and the cassette 15 is restricted from being inserted further in the direction Y1. At the same time, the bottom surface of the inserted cassette 15 rests on arms 30a2 and 30b2 of the stoppers 30a and 30b extending in a direction Y2 from the head base 25. Hence, the cassette 15 is held in the loaded position by the stoppers 30a and 30b.

A pair of substantially L-shaped guides 31 and 32 are fixed on the lower surface of the top plate of the case 11, in the vicinity of the loaded position of the cassette 15. Actually, another pair of substantially L-shaped guides are also fixed on the lower surface of the top plate of the case 11, however, the illustration thereof is omitted in FIG. 3. Arms 31a and 32a of the guides 31 and 32 extend toward the cassette 15 which is in the loaded position so that the bottom surface of the cassette 15 rests on the arms 31a and 32a. Therefore, when the cassette 15 is inserted through the inserting opening 12, the cassette 15 slides over the arms 31a, 32a, 30a2, and 30b2 and is stopped from being inserted further in the direction Y1 by the vertical parts 30a1 and 30b1. The cassette 15 is held in the loaded position by the holding parts 20a and 20b which are constituted by the stoppers 30a and 30b and the guides 31 and 32, respectively. As will be described later on in the specification, the guides 31 and 32 also have projecting parts 31b and 32b which extend in directions opposite to the respective directions in the which the arms 31a and 32a extend. The projecting parts 31b and 32b engage the locking parts 23.

The driving part 21 generally comprises reel motors 33a and 33b, a plate-shaped slide base 34 and the like. Reel driving shafts 35a and 35b are fixed to respective rotary shafts of the motors 33a and 33b. The motors 33a and 33b are mounted at predetermined positions on the slide base 34 by respective fixing plates 36a and 36b so that the reel driving shafts 35a and 35b correspond to the respective reel hubs 16a and 16b of the cassette 15. Approximately cylindrical supports 37 and 38 are fixed to the sides of the slide base 34 at positions in the vicinity of the central parts along the directions Y1 and Y2. Shafts 39 and 40 are inserted through respective supports 37 ahnd 38. The shafts 39 and 40 extend in directions X1 and X2 which are perpendicular to the cassette inserting direction Y1, and the ends of shafts 39 and 40 are fixed to the case 11 via holders 41a through 41d. The supports 37 and 38 are slidable along the respective shafts 39 and 40, and for this reason, the slide base 34 is linearly movable in the directions X1 and X2 which are perpendicular to the cassette inserting direction Y1. A hole 38a formed in one support 38 has an oval shape, and the shaft 40 is inserted through this oval hole 38a. The larger diameter of the oval hole 38a is greater than the diameter of the shaft 40 so as to absorb the vibrations, bends and the like of the slide base 34 as the slide base 34 moves in the directions X1 and X2. Hence, the driving part 21 can move smoothly between a first position whcih opposes and is separated from the cassette 15 in the loaded position and a second position where the driving part 21 engages the cassette 15.

A hole 43 which communicates with the inserting opening 12 and extends in the direction X2 is formed in the case 11. A lever part 42 extends from the slide base 34 and projects from the case 11 through the hole 43. The lever part 42 is movable in the directions X1 and X2 within the moving range of the slide base 34. The knob 13 is fitted on the tip end of the lever part 42. The slide base 34 is moved in the directions X1 and X2 by manually manipulating the knob 13 in the directions X1 and X2. As will be described later, projections 44a through 44d project from the sides of the slide base 34, and the projections 44a through 44d engage the locking parts 23 when the slide base 34 is moved to the second position described before.

A guide part 22 is mounted on the bottom surface of the slide base 34 so as to guide the driving part 21 while maintaining the horizontal state of the driving part 21. The guide part 22 generally comprises members 45a and 45b and a plate body 46 connected across the members 45a and 45b.

Projecting pin parts 47a and 48a are embeddedly provided on the ends of the member 45a, and the pin part 47a is rotatably supported by a pin support 49a which is provided on the bottom surface of the slide base 34. The other pin part 48a is engaged with a groove 50a formed in the case 11. The groove 50a rotatably supports the pin part 48a and has an elongated shape extending in the directions Y1 and Y2 so that the pin part 47a can move in the directions Y1 and Y2 in FIG. 4 as the member 45a rotates about the pin support 49a. Accordingly, the member 45a can rotate smoothly as the slide base 34 moves in the directions X1 and X2. In FIGS. 3 and 4 and the figures which follow, those parts which are provided symmetrically on the right and left sides of the apparatus are designated by the same reference numeral with a subscript "a" for those parts located on the right side of the apparatus and with a subscript "b" for those parts located on the left of the apparatus. The description of the parts with the subscript "b" will be omitted.

Because the plate body 46 is connected across the members 45a and 45b, the members 45a and 45b undergo the same displacement. Thus, the parts where the members 45a and 45b are supported on the slide base 34 constantly assume the same height position as the slide base 34 moves in the directions X1 and X2.

The moving direction of the driving part 21 is restricted to the directions X1 and X2 by the shafts 39 and 40 and the supports 37 and 38 which are fitted over the shafts 39 and 40. Furthermore, the parts where the members 45a and 45b are supported on the slide base 34 constantly assume the same height position as the slide base 34 moves in the direction X1 and X2. Therefore, the driving part 21 constantly moves linearly in the directions X1 and X2 which are substantially perpendicular to the bottom surface of the cassette 15 which is in the loaded position.

The locking parts 23 are molded members, for example. Each locking part 23 comprises support parts 23a formed at the upper part thereof making perpendicular contact with an inner side wall surface 11a of the case 11 and an arm part 23b formed at the lower part thereof making contact with the wall surface 11a with a certain angle. The arm part 23b is slidable on the wall surface 11a. Each locking part 23 is provided at a position corresponding to the projecting part 31b (or 32b) of the guide 31 (or 31b) and the projection 44a (or one of the projections 44b through 44d) of the slide plate 34. The locking parts 23 all have the same construction and operate in the same manner. For this reason, a description will only be given with respect to one locking part 23 corresponding to the projecting part 31b and the projection 44b, and descriptions of the remaining locking parts 23 will be omitted.

Upper and lower grooves 51 and 52 are formed in the locking part 23 at positions approximately opposing the side of the cassette 15 which is in the loaded position. The upper groove 51 is engaged with the projecting part 31b of the guide 31. In the state where the projecting part 31b is fitted into the upper groove 51, the support parts 23a and the arm part 23b of the locking part 23 respectively make contact with the wall surface 11a of the case 11 and the locking part 23 is held in position. The lower groove 52 is formed at such a position that the projection 44b of the slide base 34 fits into the lower groove 52 when the driving part 21 is in the second position where the driving part 21 engages the cassette 15 which is in the loaded position. Hence, the driving part 21 is held in the second position by the engagement between the projection 44b and the lower groove 52.

A base end of each of the ejecting members 24a and 24b is rotatably supported by a holder part 53a or 53b which is provided on the case 11. The other tip end of each of the ejecting members 24a and 24b extends toward the loaded position of the cassette 15. The ejecting members 24a and 24b are mounted on the case 11 at two mutually separated positions corresponding to the front right and left parts of the loaded position of the cassette 15.

A tip end 24a1 of the ejecting member 24 slightly projects within the loaded position of the cassette 15 when th cassette 15 is not inserted into the apparatus 10. A contact part 24a2 is formed on the base end of the ejecting member 24 at such a position that the contact part 24a2 will make contact with the end part of the slide base 34 when the driving part 21 is in the first position.

Next, a description will be given with respect to the operation of the apparatus 20 when the cassette 15 is inserted into the apparatus 10 through the inserting opening 12.

Figure 5:
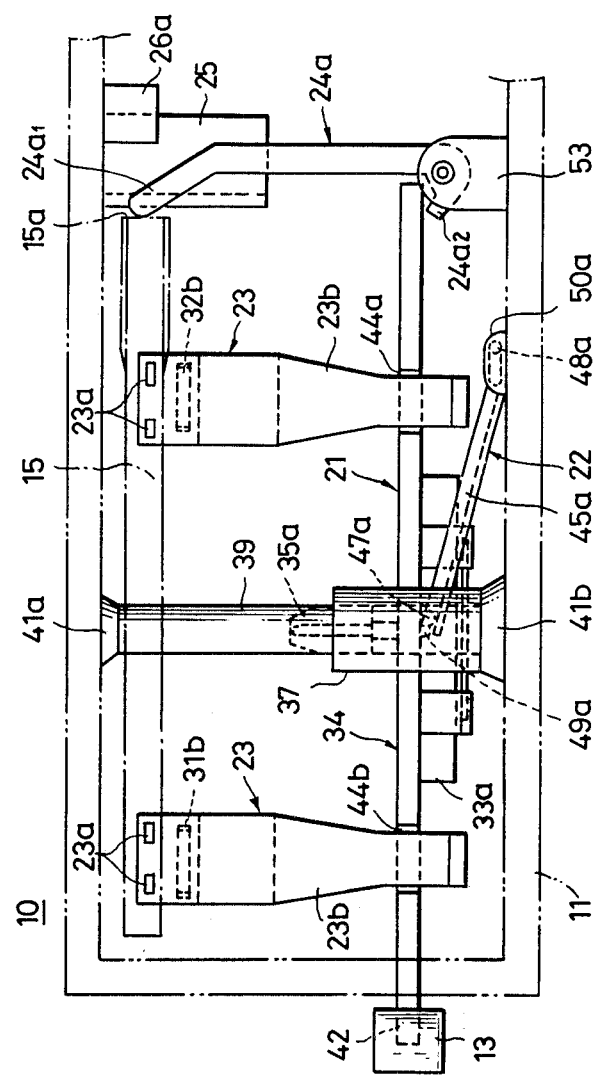
FIG. 5 is a side view showing the apparatus shown in FIG. 1 in a vertical cross section for explaining especially an essential part of an ejecting member.

First, the cassette 15 is inserted into the apparatus 10 through the inserting opening 12 of the case 11 in the direction Y1 as shown in FIG. 1. The inserted cassette 15 slides over the arms 31a and 31b of the guides 31 and 32 shown in FIG. 3. At the loaded position where the magnetic tape of the inserted cassette 15 makes contact with the magnetic head 27, the front surface 15a of the cassette 15 is in contact with the vertical parts 30a1 and 30b1 of the stoppers 30a and 30b and the cassette 15 is prevented from being inserted further in the direction Y1. In addition, the cassette 15 in the loaded position rests on the arms 30a2 and 30b2 of the stoppers 30a and 30b. Hence, the cassette 15 is held in the loaded position by the holding parts 20a and 20b which are constituted by the stoppers 30a and 30b and the guides 31 and 32. As the front surface 15a of the cassette 15 makes contact with the vertical parts 30a1 and 30b1 of the stoppers 30a and 30b, the tip ends 24a1 and 24b1 of the ejecting members 24a and 24b are also pushed by the front surface 15a. Thus, the ejecting members 24a and 24b rotate slightly about the base ends thereof and the contact parts 24a2 and 24b2 move the slide base 34 slightly upward in FIG. 5.

The knob 13 is manually moved in the direction X1 in FIG. 1. Since the knob 13 is connected to the slide base 34 via the lever part 42, the slide base 34 moves in the direction X1 in FIG. 3 as the knob 13 is manually moved in the direction X1. Due to the provision of the supports 37 and 38, the shafts 39 and 40, and the guide part 22 described before, the driving part 21 constantly moves linearly in the direction X1 which is perpendicular to the bottom surface of the cassette 15 which is in the loaded position, that is, perpendicular to the inserting path of the cassette 15.

As the slide base 34 moves in the direction X1 and approaches the cassette 15 which is in the loaded position, the projections 44a through 44d provided on the slide base 34 make contact with the arm parts 23b of the locking parts 23. The arm parts 23b are pushed toward the respective wall surfaces 11a of the case 11 as the slide base 34 moves in the direction X1. The locking parts 23 are molded from a such material that the locking parts 23 can undergo resilient deformation, and the arm parts 23b are in contact with the respective wall surfaces 11a with a certain angle. Accordingly, when the locking parts 23 are pushed by the slide base 34, the tip end portions of the arm parts 23b slide on the respective wall surfaces 11a in the direction X2 which is opposite to the moving direction X1 of the slide base 34. Hence, the slide base 34 is permitted to undergo further movement in the direction X1.

Figure 6:
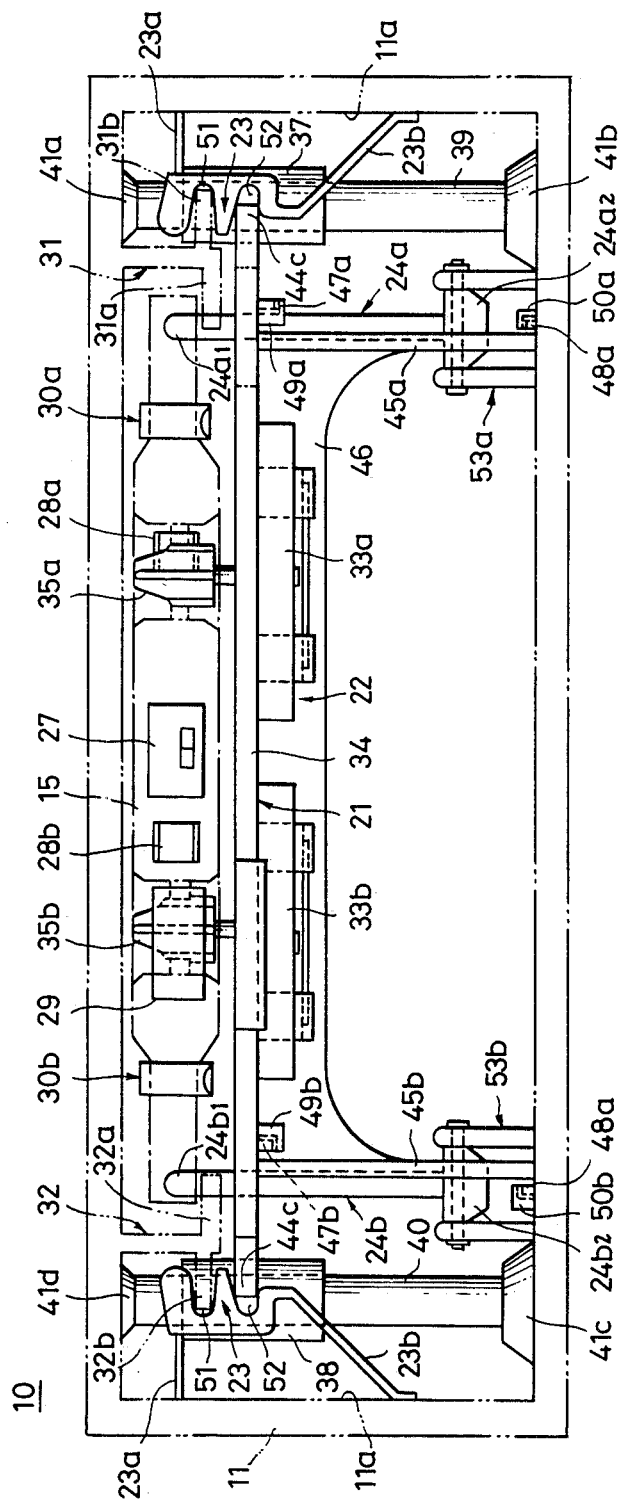
FIG. 6 is a front view showing the apparatus shown in FIG. 1 in a vertical cross section in a state where a driving part is engaged with the cassette.

When the slide base 34 undergoes the further movement in the direction X1, the reel driving shafts 35a and 35b engage the respective reel hubs 16a and 16b of the cassette 15 as shown in FIG. 6. When the driving part 21 reaches the second position where the driving shafts 35a and 35b engage the respective reel hubs 16a and 16b of the cassette 15, the projections 44a through 44d of the slide base 34 fit into the respective lower grooves 52 of the locking parts 23 and the locking parts 23 return from the resiliently deformed state to the original state due to the resilient restoration force thereof. As a result, the driving part 21 is locked in the second position. On the other hand, the cassette 15 is held in the loaded position by the holding parts 20a and 20b, and the magnetic tape of the cassette 15 is in contact with the magnetic head 27, the tape guides 28a and 28b, and the pinch roller 29. Therefore, signals can be recorded on and/or reproduced from the magnetic tape of the cassette 15 by driving the magnetic tape by the driving part 21.

Next, when ejecting the cassette 15 outside the apparatus 10, the knob 13 is manually pushed downwardly in the direction X2. As a result, the slide base 34 is urged to move in the direction X2 and the projections 44a through 44d push against the locking part 23. The locking parts 23 are deformed by the pushing force exerted by the projections 44a through 44d, and the projections 44a through 44d escape from the respective lower grooves 52 of the locking parts 23. After the projections 44a through 44d escape from the grooves 52, the driving part 21 is guided linearly in the direction X2 by the provision of the supports 37 and 38, the shafts 39 and 40, and the guide part 22 described before.

When the driving part 21 moves downwardly in the direction X2, the end part of the slide base 34 eventually makes contact with the contact parts 24a2 and 24b2 of the ejecting members 24a and 24b and the contact parts 24a2 and 24b2 are pushed in the direction Y1. Thus, the ejecting members 24a and 24b rotate slightly counterclockwise in FIG. 5 and the tip ends 24a1 and 24b1 of the ejecting members 24a and 24b push the front surface 15a of the cassette 15 in the direction Y2. The cassette 15 which is pushed by the tip ends 24a1 and 24b1 moves in the direction Y2 by sliding over the holding parts 20a and 20b, and the rear end of the cassette 15 projects out of the case 11 through the inserting opening 12. For this reason, the ejected cassette 15 can easily be extracted out of the apparatus 10 by the operator.

Although the driving part 21 is moved manually by manipulating the knob 13 in the embodiment described heretofore, it is also possible to drive the slide base 34 by use of a motor. In other words, the slide base 34 may be moved automatically in the direction X1 or X2 by operating the motor. However, a detailed description on the provision of the automatic drive for the slide base 34 will not be given in the present specification.

Only one side of the cassette 15 is played on the apparatus 10. That is, the cassette 15 must be inserted into the apparatus 10 with the correct side facing the predetermined direction. Hence, in the case of the first embodiment described before, the cassette 15 must be inserted with the correct side of the cassette 15 facing up in FIG. 3. In order to prevent the incorrect side of the cassette 15 from being played on the apparatus 10, the side detection groove 17 is formed in the rear surface of the cassette 15 as shown in FIG. 2. The side detection groove 17 is provided on the rear of the cassette 15 at an offset position with respect to the central part along the width direction of the cassette 15. A mechanism for detecting the side of the cassette, that is, for detecting whether or not the cassette is inserted into the apparatus with the correct side facing a predetermined direction, generally comprises a rod which engages the side detection groove of the cassette. The cassette cannot reach the loaded position within the apparatus unless the cassette is inserted with the correct side facing the predetermined direction and the rod engages the side detection groove of the correctly inserted cassette. On the other hand, a mechanism for positioning the cassette in the loaded position within the apparatus generally comprises a leaf spring or the like for urging the cassette in a predetermined direction, and this mechanism is provided outside the loaded position of the cassette in the plan view. The above two independent mechanisms must be provided in the apparatus, and one of the mechanisms must be provided outside the loaded position of the cassette in the plan view. For this reason, there is a problem in that a large space is required within the apparatus to mount these mechanisms in the apparatus and it is difficult to downsize the apparatus.

Figure 7:
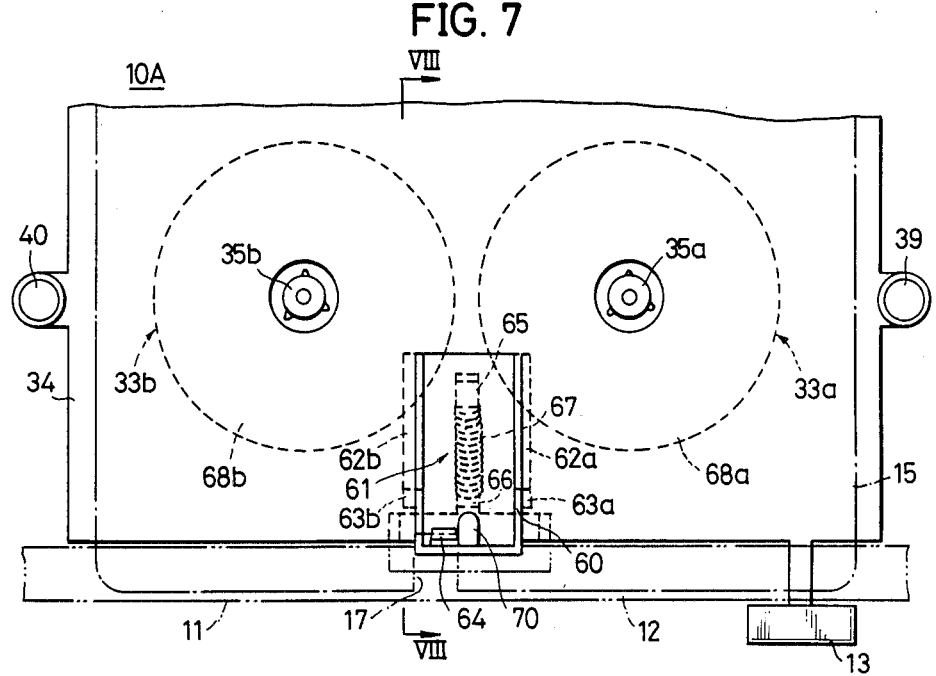
FIG. 7 is a plan view showing an essential part of a second embodiment of the magnetic recording and/or reproducing apparatus according to the present invention.
Figure 8:
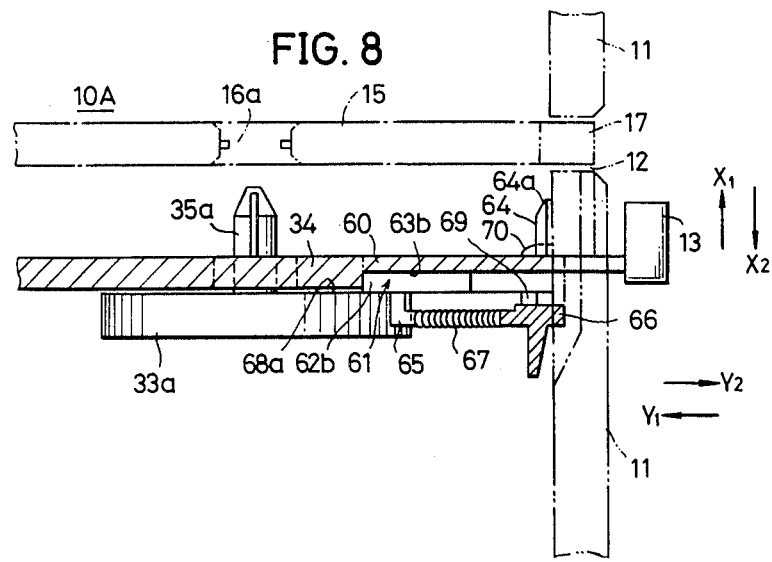
FIG. 8 is a view in vertical cross section showing the apparatus shown in FIG. 7 long a line VIII—VIII.

Accordingly, a description will now be given with respect to an embodiment in which the above described problem is eliminated. FIGS. 7 and 8 are a plan view and a view in a vertical cross section along a line VIII—VIII in FIG. 7 respectively showing an essential part of a second embodiment of the apparatus according to the present invention. In FIGS. 7 and 8 and FIGS. 9 and 10 which will be described later, those parts which are the same as those corresponding parts in FIGS. 3 and 4 are designated by the same reference numerals and description thereof will be omitted. FIGS. 7 and 8 show a state where the cassette 15 indicated by a one-dot chain line is inserted up to the loaded position within an apparatus 10A. The case 11 is indicated by a two-dot chain line. In the state shown in FIGS. 7 and 8, the magnetic tape of the cassette 15 is in contact with the magnetic head (not shown) and the like.

In FIG. 8, the slide base 34 (driving part 21) is in the first position opposing and separated from the cassette 15 which is in the loaded position. The slide base 34 can be moved upwardly in the direction X1 by manipulating the knob 13 as described before. The reel driving shafts 35a and 35b are arranged at positions corresponding to the reel hubs 16a and 16b of the cassette 15. When the slide base 34 (driving part 21) is moved to the second position, the reel driving shafts 35a and 35b engage the respective reel hubs 16a and 16b and the reel hubs 16a and 16b can be rotated by the respective reel motors 33a and 33b.

An opening 60 is formed in the slide base 34 at a part which is closer to the inserting opening 12 of the apparatus 10A and is located at approximately the center along the width direction of the slide base 34. A guide arm 61 is mounted within the opening 60.

Flanges 62a and 62b are formed on the sides of the guide arm 61, and groove parts 63a and 63b are formed on the edges of the opening 60 at positions corresponding to the flanges 62a and 62b. The flanges 62a and 62b fit over the respective groove parts 63a and 63b and the guide arm 61 is slidable within the opening 60 in the direction Y1 and Y2.

An engaging member 64 which projects upwardly in the direction X1 is provided on the guide arm 61 at a position slightly deviated in the direction Y1 from a position corresponding to the side detection groove 17 of the cassette 15 which is inserted into the loaded position with the correct side of the cassette 15 facing up in FIG. 8. The cassette 15 which is inserted into the apparatus 10A with the correct side of the cassette 15 facing up in FIG. 8, will simply be referred to as a "correctly inserted cassette 15", for convenience's sake. The engaging member 64 moves upward (direction X1) as the slide base 34 is moved in the direction X1, and the engaging member 64 enters into the side detection groove 17 of the correctly inserted cassette 15. Since a sloping part 64a is formed on the top end of the engaging member 64, the engaging part 64 smoothly enters into the side detection groove 17 of the correctly inserted cassette 15. As shown in FIGS. 9 and 10, the engaging member 64 positively enters within the side detection groove 17 of the correctly inserted cassette 15 when the slide base 34 (driving part 21) reaches the second position where the reel driving shafts 35a and 35b engage the respective reels 16a and 16b of the cassette 15.

When the cassette 15 is inserted into the apparatus 10A with the incorrect side of the cassette 15 facing up in FIG. 8, the engaging member 64 will hit the cassette 15 and restrict the slide base 34 from being moved in the direction X1 and the slide base 34 cannot reach the second position. The height of the projecting member 64 from the top surface of the slide base 34 is selected so that the reel driving shafts 35a and 35b do not engage the reel hubs 16a and 16b of the cassette 15 when the engaging member 64 hits the cassette 15. Therefore, the magnetic tape of the cassette 15 which is inserted into the apparatus 10A with the incorrect side facing up in FIG. 8 will not be driven, and the accidental recording and/or reproduction with respect to the incorrect side of the cassette 15 can be positively prevented.

An approximately L-shaped member 65 is provided on the lower surface of the guide arm 61, and a stepped part 66 is formed on the lower surface of the slide base 35 at a position corresponding to the L-shaped member 65. A coil spring 67 is provided between the L-shaped member 65 and the stepped part 66. The coil spring 67 acts on the L-shaped member 65 and constantly urges the guide arm 61 in the direction Y1 in FIG. 8. The inner wall surface of the front panel of the case 11 is grooved along the moving path of the stepped part 66 as shown in FIG. 8.

The engaging member 64 is provided at the position slightly deviated in the direction Y1 from the position corresponding to the side detection groove 17 of the correctly inserted cassette 15 as described before. Hence, when the engaging member 64 engages the side detection groove 17, the engaging member 64 moves slightly in the direction Y2. As the engaging member 64 moves slightly in the direction Y2, the guide arm 61 also slides slightly in the direction Y2 against the force exerted by the coilspring 67. As a result, the an urging mechanism constituted by the L-shaped member 65, the stepped part 66, the coil spring 67 and the like urges the engaging member 64 to move in the direction Y1, and the cassette 15 is accordingly pushed in the direction Y1 by the engaging member 64. In other words, the cassette 15 is positively positioned in the loaded position by the action of the engaging member 64. Because the cassette 15 is urged in the direction Y1 which is the same as the direction in which the magnetic tape of the cassette 15 is urged against the magnetic head (not shown), the magnetic tape makes contact with the magnetic head with a suitable contact pressure and the recording and/or reproduction can be performed in a satisfactory state.

Parts of the lower surface of the guide arm 61 closer to the motors 33a and 33b slidably rest on top surfaces 68a and 68b of the respective motors 33a and 33b. Further, a projection 69 is formed on the lower surface of the guide arm 61 at a position closer to the inserting opening 12 so that the guide arm 61 can slide over the top surface of the stepped part 66. Therefore, the guide arm 61 slides under guidance of the top surfaces 68a and 68b of the motors 33a and 33b, the groove parts 63a and 63b of the opening 60, the projection 69 and the like, and will not escape from the opening 60.

A holding member 70 is provided at the base end of the engaging member 64. As the reel driving shafts 35a and 35b engage the reel hubs 16a and 16b of the cassette 15 which is in the loaded position, the holding member 70 cooperates with the stoppers (not shown) described before to hold the cassette 15 in a position slightly separated from the top surface of the slide base 34 to ensure smooth and satisfactory engagement of the reel driving shafts 35a and 35b with the respective reel hubs 16a and 16b.

According to the second embodiment, the detection of the side of the cassette and the positioning of the cassette in the loaded position are performed by a single engaging member. Therefore, the construction of the apparatus is simple compared to the conventional apparatus and the apparatus can be downsized.

As shown in FIG. 2, the cassette 15 is provided with the erroneous erasure preventing tab 18. However, since the erroneous erasure preventing tab 18 is provided on the rear surface of the cassette 15, the construction of a tab detecting mechanism for detecting the existence of the erroneous erasure preventing tab 18 becomes complex. That is, the tab detecting mechanism cannot detect the existence of the erroneous erasure preventing tab 18 unless the tab detecting mechanism is disposed at a position opposing the erroneous erasure preventing tab 18, but at the same time, the tab detecting mechanism must be disposed at such a position that the tab detecting mechanism will not interfere with the insertion of the cassette 15 through the inserting opening 12. For this reason, in order to detect the existence of the erroneous erasure preventing tab 18, the tab detecting mechanism must be moved to the position opposing the erroneous erasure preventing tab 18 after the cassette 15 is inserted into the loaded position within the apparatus through the inserting opening 12, and the construction of the tab detecting mechanism becomes complex.

Accordingly, a description will now be given with respect to an embodiment in which the above described problem is eliminated. FIGS. 11A and 11B are a plan view and a side view respectively showing an essential part of a third embodiment of the apparatus according to the present invention. In FIGS. 11A and 11B and FIGS. 12A through 14 which will be described later, those parts which are the same as those coresponding parts in FIGS. 3 and 4 are designated by the same reference numerals and description thereof will be omitted. In FIGS. 11A through 13B, the case 11 of an apparatus 11B is indicated by a two-dot chain line, and the cassette 15 is indicated by a one-dot chain line.

A stepped part 11b is provided on the front panel of the case 11 of the apparatus 11B, in the vicinity of the hole 43. As will be described later, when the cassette 15 is in the loaded position within the apparatus 10B as shown in FIGS. 11A and 11B, the erroneous erasure preventing tab 18 provided on the rear surface of the cassette 15 and the stepped part 11b lie on essentially the same plane. The knob 13 comprises an accommodating part 72 which constitutes an essential part of the present embodiment. The accommodating part 72 is connected to the slide base 34 via the lever part 42 and is movable in the directions X1 and X2 together with the slide base 34.

A cam 73 is provided with a rotary shaft 73a which is located in the vicinity of the outer periphery of the cam 73 as shown in FIG. 11B. The rotary shaft 73a is fitted into a groove 73a which is formed in the accomodating part 72, and the rotary shaft 73a is rotatable within the groove 72a. A part of the cam 73 projects outside the accommodating part 72.

A rotary lever 74 comprises a cylindrical part 74a at a tip end thereof, and the cylindrical part 74a is fitted over a shaft 72b which is provided in the accommodating part 72. A flat part 74b is formed on the other end of the rotary lever 74. The flat part 74b is in contact with the outer peripheral surface of the cam 73 and the rotary lever 74 is urged to rotate counterclockwise in FIG. 11A. A projecting part 74c is formed on the rotary lever 74 at an intermediate part between the cylindrical part 74a and the flat part 74b. A switch 75 which is opened and closed by the projecting part 74c is mounted on a printed circuit 76. The printed circuit 76 is fixedly fitted into a groove 72c is formed in a predetermined part of the accommodating part 72.

Connecting wires (not shown) from the printed circuit 76 pass through an opening 72d in the accommodating part 72 and an elongated hole 42a provided in the lower part of the opening 42, and connect to a circuit (not shown) within the apparatus 10B.

In the state shown in FIGS. 11A and 11B, the slide base 34 is in the first position. The outer peripheral surface of the cam 73 is in contact with the stepped part 11b of the case of the apparatus 10B. The rotary lever 74 is pushed by the outer peripheral surface of the cam 73 and is rotated counterclockwise about the shaft 72b in the FIG. 11A, and the projecting part 74c pushes a contact part 75a of the switch and maintains in the switch 75 in the closed state. When the switch 75 is closed, the circuit within the apparatus 10B is in a state where a recording operation can be carried out.

Figure 12A:
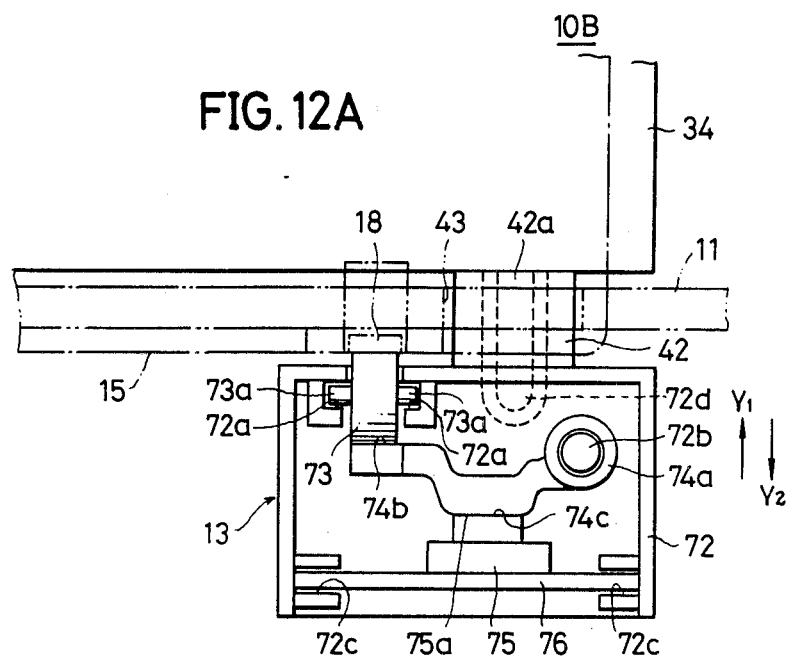
FIGS. 12A and 12B are a plan view and a side view respectively showing the apparatus shown in FIGS. 11A and 11B in a state where the apparatus can perform a recording operation.
Figure 12B:
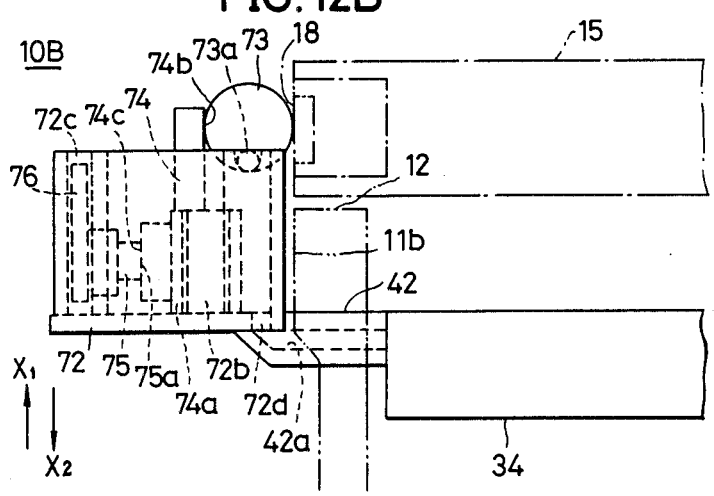

FIGS. 12A and 12B show the apparatus 10B in a state where the slide base 34 is in the second position. Further, in FIGS. 12A and 12B, the erroneous erasure preventing tab 18 is provided on the cassette 15. When the slide base 34 is moved in the direction X1 from the first position to the second position, the outer peripheral surface of the cam 73 slides over the stepped part 11b and makes contact with the erroneous erasure preventing tab 18. Because the erroneous erasure preventing tab 18 and the stepped part 11b lied in essentially the same plane as described before, the cam 73 essentially does not rotate. Accordingly, the rotary lever 74 does not rotate, and the switch 75 remains closed. Thus, the circuit of the apparatus 10B is in the state where the recording operation can be carried out.

Figure 13A:
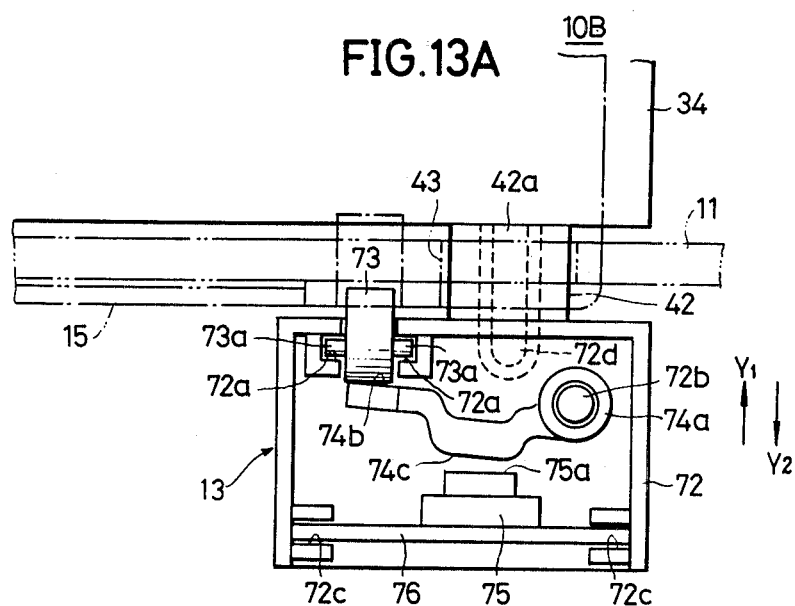
FIGS. 13A and 13B are a plan view and a side view respectively showing the apparatus shown in FIGS. 11A and 11B in a state where the apparatus cannot perform a recording operation.
Figure 13B:
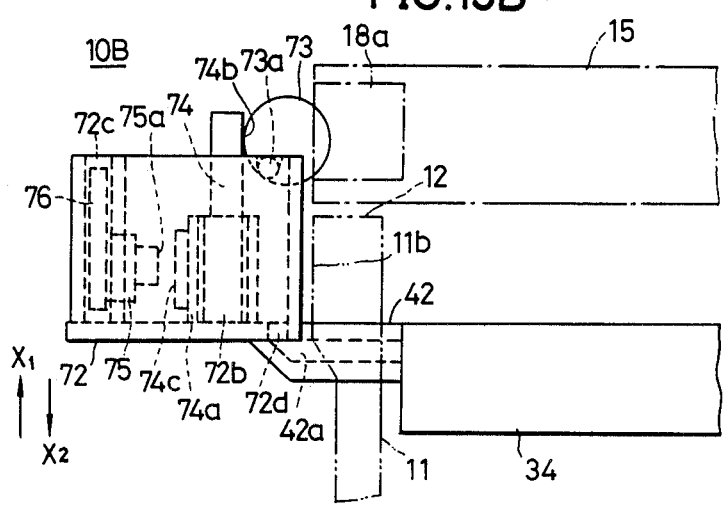

FIGS. 13A and 13B show the apparatus 10B in a state where the slide base 34 is in the second position, however, the erroneous erasure preventing tab 18 of the cassette 15 is removed and does not exist. In this case, a cutout 18a is formed in the cassette 15 due to the removal of the erroneous erasure preventing tab 18. The cam 73 rotates about the rotary shaft 73a until the cam 73 hits the cassette 15, and a part of the cam 73 enters into the cutout 18a. The rotary lever 74 rotates clockwise about the shaft 72b due to the rotation of the cam 73 while the outer peripheral surface of the cam 73 remains in contact with the flat part 74b of the rotary lever 74. When the rotary lever 74 rotates clockwise, the projecting part 74c separates from the swithc 75 and the switch 75 is opened. When the switch 75 is open, the circuit of the apparatus 10B is in a state where a recording operation cannot be performed.

Figure 14:
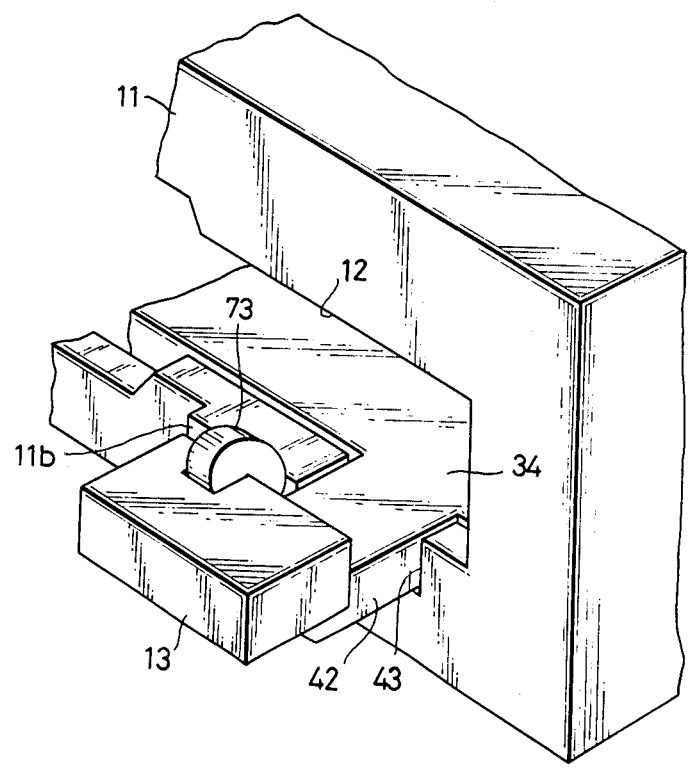
FIG. 14 is a perspective view generally showing a tab detecting mechanism on an enlarged scale.

FIG. 14 shows the actual outer appearance of the tab detecting mechanism of the apparatus 10B on an enlarged scale. The accommodating part 72 is substantially covered by the knob 13 so that the operator's finger tips or the like will not touch the internal mechanisms of the tab detecting mechanism when the operator manipulates the knob 13.

According to the present embodiment, the existence of the erroneous erasure preventing tab of the cassette can be detected positively by a simple mechanism without interfering with the insertion of the cassette into the apparatus, because the tab detecting mechanism is provided on the knob which is manipulated when moving the slide base (driving mechanism). In addition, since the tab detecting mechanism is provided on the knob, it ispossible to downsize the apparatus.

Further, the present invention is not limited to these embodiments, but various variations and modifications may be made without departing from the scope of the present invention.

What is claimed is:

1. A magnetic recording and/or reproducing apparatus for recording and/or reproducing signals on and/or from a magnetic tape which is accomodated within a cassette, said comprising reels which are respectively wound with the magnetic tape, said apparatus comprising:

a case;
   an inserting opening through which the cassette is inserted into said apparatus along a cassette inserting path which extends in a first direction from a front surface of the cassette, said inserting opening being provided in a front surface of said case;
   magnetic head means for recording and/or reproducing signals on/or from the magnetic tape, said magnetic head means being located at a position opposing said inserting opening so that the cassette is inserted in said first direction towards said magnetic head;

stationary holding means for holding the cassette which is inserted in the first direction via the cassette inserting path in a loaded position within said appratus, said magnetic head means being in contact with the magnetic tape of the cassette in said loaded position;

movable driving means for driving at least one of said reels, said movable driving means being movable between a first position and a second position, said driving means in said first position being separated from and opposing the cassette in said loaded position, said driving means in said second position being engageable with said at least one of said reels of the cassette in said loaded position to drive the magnetic tape;

guiding means for guiding the movement of said movable driving means so that said movable driving means moves linearly between said first and second positions in a direction approximately perpendicular to said cassette inserting path; and moving means connected to said movable drivng means for moving said movable driving means between said first and second positions.

2. An apparatus as claimed in claim 1 in which said stationery holding means comprises a first approximately L-shaped member for supporting a bottom surface of the cassette which is in said loaded position in a vicinity of the side of the cassette, and a second approximately L-shaped member for supporting the bottom surface of the cassette in a vicinity of the front of the cassette.

3. An apparatus as claimed in claim 2 in which said second approximately L-shaped member also has a function of a stopper for restricting the movement of the cassette in said first direction when the cassette is inserted into said loaded position.

4. An apparatus as claimed in claim 1 in which said movable driving means comprises a slide base, first and second reel motors fixed to the slide base, and first and second reel driving shafts rotated by the respective reel motors.

5. An apparatus as claimed in claim 4 in which said movable driving means further comrpises supports fixed to the slide base, said guiding means comprising shafts provided perpendicularly to said cassette inserting path, said shafts being inserted through said supports of said movable driving means to guide said supports along said shafts.

6. An apparatus as claimed in claim 1 in which said moving means comprises a manipulation part which is manipulated to manually move said movable driving means between said first and second positions.

7. An apparatus as claimed in claim 1 which further comprises locking means for locking said movable driving means in said second position.

8. An apparatus as claimed in claim 1 which further comprises ejecting means for ejecting the cassette which is in said loaded position in a second direction outside said apparatus, said second direction being opposite to said first direction.

9. An apparatus as claimed in claim 8 in which said ejecting means ejects the cassette responsive to the mvoing of said driving means to said movable first position from said second position in a state where the cassette is in said loaded position.

10. An apparatus as claimed in claim 1 which further comprises engaging means for engaging a side detection groove of the cassette, said side detection groove being provided on the rear of the cassette at a position offset from a central part along the width direction of th cassette for detecting the side of the cassette, and urging means for constantly urging said engaging means in said first direction, said engaging means being slidably provided on said movable driving means.

11. An apparatus as claimed in claim 10 in which said engaging means comprises an engaging member extending in the moving direction of said movable dirving means and a sloping part provided on a top part of the engaging member, said engaging member being located at a position slightly deviated in said first direction from a position corresponding to the side detection groove of the cassette which is in the loaded position when said movable driving means is in said first position, said sloping part being guided by an edge part of said side detection groove and said engaging member moving in a second direction against an urging force of said urging means as said mvoable driving means moves to said second position from said first position, said second direction being opposite to said first direction.

12. An apparatus as claimed in claim 10 in which said urging means comprises a coil spring provided between said engaging means and said movable driving means.

13. An apparatus as claimed in claim 1 in which said moving means comprises a manipulation part which is manipulated to to manually move said movable driving means between said first and second positions, said manipulation part unitarily comprising tab detecting means for detecting the existence of an erroneous erasure preventing tab which is provided on a rear surface of the casette which is in said loaded position.

14. An apparatus as claimed in claim 13 in which said tab detecting means comprises a can which opposes and is in contact with the erroneous erasure preventing tab of the cassette which is in said loaded position when said movable driving means is in said second position, said cam being constantly urged in said first direction.

15. An apparatus as claimed in claim 14 in which said manipulation part comprises an accommodating part, said tab detecting means being substantially accommodated within said accommodating part so that only a part of said cam projects outside said accommodating part in said first direction.

* * * * *